(12) United States Patent
Polk

(10) Patent No.: US 9,168,690 B2
(45) Date of Patent: Oct. 27, 2015

(54) EXPANDED COMPRESSION MOLDING OF COMPOSITE PLASTICS

(75) Inventor: Dale E. Polk, Titusville, FL (US)

(73) Assignee: LRM Industries, Inc., Rockland, FL (US)

( * ) Notice: Subject to any disclaimer, the term of this patent is extended or adjusted under 35 U.S.C. 154(b) by 129 days.

(21) Appl. No.: 13/879,342

(22) PCT Filed: Oct. 14, 2011

(86) PCT No.: PCT/US2011/056325
§ 371 (c)(1),
(2), (4) Date: Jul. 12, 2013

(87) PCT Pub. No.: WO2012/051513
PCT Pub. Date: Apr. 19, 2012

(65) Prior Publication Data
US 2013/0307191 A1 Nov. 21, 2013

Related U.S. Application Data

(60) Provisional application No. 61/455,046, filed on Oct. 14, 2010.

(51) Int. Cl.
B29C 43/36 (2006.01)
B29C 45/17 (2006.01)
B29C 47/00 (2006.01)
B29C 45/00 (2006.01)
B29C 47/08 (2006.01)
B29C 43/58 (2006.01)

(52) U.S. Cl.
CPC ............ *B29C 45/1744* (2013.01); *B29C 43/36* (2013.01); *B29C 45/00* (2013.01); *B29C 47/0019* (2013.01); *B29C 47/0866* (2013.01); *B29C 2043/5808* (2013.01)

(58) Field of Classification Search
CPC ............ B29C 2043/5808; B29C 43/36; B29C 45/1744; B29C 47/0019; B29C 47/0866

USPC ............ 264/328.1, 328.2, 258, 279; 425/145, 425/542

See application file for complete search history.

(56) References Cited

U.S. PATENT DOCUMENTS

| 3,531,360 | A | * | 9/1970 | Cantrill | 156/580 |
| 4,093,176 | A | * | 6/1978 | Contastin | 249/167 |
| 4,447,201 | A | * | 5/1984 | Knudsen | 425/397 |
| 4,498,384 | A | * | 2/1985 | Murphy | 100/224 |
| 2003/0034588 | A1 | * | 2/2003 | Miura et al. | 264/258 |

* cited by examiner

*Primary Examiner* — Jill Heitbrink

(57) ABSTRACT

Composite polymeric articles significantly larger than the size of a compression molding press are produced by providing a plurality of expandable pillows interposed between an upper plate and the upper exterior surface of an outside the press upper mold. The upper plate has a plurality of downwardly extending paired vertical arms attached to opposite sides of the upper plate. Each vertical arm has a lower portion having a eyelet (or aperture), and each pair of vertical arms together forms an aligned pair of eyelets. When the upper and lower mold portions are pressed together, the eyelets reside below the exterior lower surface of the outside the press lower mold portion. Each eyelet is dimensioned to reversibly receive a horizontal or lateral arm that is deployed below the exterior lower surface of the outside the press lower mold portion. A plastic material is introduced onto the interior surface of the lower mold portion, which is compressed between the upper and lower mold portions via a press having a press area that does not extend out over the outside the press portions of the upper and lower mold portions. The lateral arms are extended through the paired and aligned eyelets. The plurality of expandable pillows are expanded, and the lateral arms are brought into compressive abutment with the exterior lower surface of the outside the press lower mold portion. The plastic material residing between the outside the press upper mold portion and the outside the press lower mold portion is then correspondingly compressed.

29 Claims, 4 Drawing Sheets

EXPANDED COMPRESSION MOLDING OF COMPOSITE PLASTICS

FIELD OF THE INVENTION

The present invention relates to a polymeric molding process and apparatus and especially to a composite polymeric process and apparatus that utilizes an expanded size upper and lower mold portion to mold very large composite polymeric plastic parts that are outside the size limits of conventional molding presses.

BACKGROUND OF THE INVENTION

There are a wide variety of molding systems to produce parts of thermoplastic or thermoset resins, or thermoplastic or thermoset composites. In vacuum molding, a slab (constant thickness sheet) of heated polymeric material is placed on the vacuum mold and a vacuum drawn between the mold and the heated plastic material to draw the plastic material onto the mold. Similarly, in compression molding, a lump or slab of preheated material is pressed between two molding forms that compress the material into a desired part or shape.

Compression Molding

Compression molding is by far the most widespread method currently used for commercially manufacturing structural thermoplastic composite components. Typically, compression molding utilizes a glass mat thermoplastic (GMT) composite comprising polypropylene or a similar matrix that is blended with continuous or chopped, randomly oriented glass fibers. GMT is produced by third-party material compounders, and sold as standard or custom size flat blanks to be molded. Using this pre-impregnated composite (or pre-preg as it is more commonly called when using its thermoset equivalent), pieces of GMT are heated in an oven, and then laid on a molding tool. The two matched halves of the molding tool are closed under great pressure, forcing the resin and fibers to fill the entire mold cavity. Once the part is cooled, it is removed from the mold with the assistance of an ejecting mechanism.

Generally, the matched molding tools used for GMT forming are machined from high strength steel to endure the continuous application of the high molding pressure without degradation. These molds are often actively heated and cooled to accelerate cycle times and improve the surface finish quality. GMT molding is considered one of the most productive composite manufacturing processes with cycle times ranging between 30 and 90 seconds. Compression molding does require a high capital investment, however, to purchase high capacity presses (2000-3000 tons of pressure) and high-pressure molds, therefore it is only efficient for large production volumes. Lower volumes of smaller parts can be manufactured using aluminum molds on existing presses to save some cost. Other disadvantages of the process are low fiber fractions (20% to 30%) due to viscosity problems, and the ability to only obtain intermediate quality surface finishes.

Injection Molding

Injection molding is the most prevalent method of manufacturing for non-reinforced polymeric parts, and is becoming more commonly used for short-fiber reinforced thermoplastic composites. Using this method, thermoplastic pellets are impregnated with short fibers and extruded into a closed two-part hardened steel tool at injection pressures usually ranging from 15,000 to 30,000 psi. Molds are heated to achieve high flow and then cooled instantly to minimize distortion. Using fluid dynamic analysis, molds can be designed which yield fibers with specific orientations in various locations, but generically injection molded parts are isotropic. The fibers in the final parts typically are no more than one-eighth (⅛)" long, and the maximum fiber volume content is about 40%. A slight variation of this method is known as resin transfer molding (RTM). RTM manufacturing utilizes matted fibers that are placed in a mold which is then charged with resin under high pressure. This method has the advantages of being able to manually orient fibers and use longer fiber lengths.

Injection molding is the fastest of the thermoplastic processes, and thus is generally used for large volume applications such as automotive and consumer goods. The cycle times range between 20 and 60 seconds. Injection molding also produces highly repeatable near-net shaped parts. The ability to mold around inserts, holes and core material is another advantage. Finally, injection molding and RTM generally offer the best surface finish of any process.

The process discussed above suffers from real limitations with respect to the size and weight of parts that can be produced by injection molding, because of the size of the required molds and capacity of injection molding machines. Therefore, this method has been reserved for small to medium size production parts. Most problematic from a structural reinforcing point is the limitation regarding the length of reinforcement fiber that can be used in the injection molding process.

Composites and other Processes

Composites are materials formed from a mixture of two or more components that produce a material with properties or characteristics that are superior to those of the individual materials. Most composites comprise two parts, a matrix component and reinforcement component(s). Matrix components are the materials that bind the composite together and they are usually less stiff than the reinforcement components. These materials are shaped under pressure at elevated temperatures. The matrix encapsulates the reinforcements in place and distributes the load among the reinforcements. Since reinforcements are usually stiffer than the matrix material, they are the primary load-carrying component within the composite. Reinforcements may come in many different forms ranging from fibers, to fabrics, to particles or rods imbedded into the matrix that form the composite.

There are many different types of composites, including plastic composites. Each plastic resin has its own unique properties, which when combined with different reinforcements create composites with different mechanical and physical properties. Plastic composites are classified within two primary categories: thermoset and thermoplastic composites.

Thermoset composites use thermoset resins as the matrix material. After application of heat and pressure, thermoset resins undergo a chemical change, which cross-links the molecular structure of the material. Once cured, a thermoset part cannot be remolded. Thermoset plastics resist higher temperatures and provide greater dimensional stability than most thermoplastics because of the tightly cross-linked structure found in thermoset plastic. Thermoplastic matrix components are not as constrained as thermoset materials and can be recycled and reshaped to create a new part.

Common matrix components for thermoplastic composites include polypropylene (PP), polyethylene (PE), polyetheretherketone (PEEK), polyether imide (PEI), polyethylene terephthalate (PET), acrylonitrile-butadiene-styrene (ABS) and polyamide (nylon). Thermoplastics that are reinforced with high-strength, high-modulus fibers to form thermoplastic composites provide dramatic increases in strength and stiffness, as well as toughness and dimensional stability.

Molding Methods for Thermoplastic Composites Requiring "Long" fibers

None of the processes described above are capable of producing a thermoplastic composite reinforced with long fibers (i.e., greater 12 millimeters) that remain largely unbroken during the molding process itself; this is especially true for the production of large and more complex parts.

Historically, a three-step process was utilized to mold such a part: (1) third party compounding of pre-preg composite formulation; (2) preheating of pre-preg material in oven, and, (3) insertion of molten material in a mold to form a desired part. This process has several disadvantages that limit the industry's versatility for producing more complex, large parts with sufficient structural reinforcement.

One disadvantage is that the sheet-molding process cannot produce a part of varying thickness, or parts requiring "deep draw" of thermoplastic composite material. The thicker the extruded sheet, the more difficult it is to re-melt the sheet uniformly through its thickness to avoid problems associated with the structural formation of the final part. For example, a pallet having feet extruding perpendicularly from the top surface is a deep draw portion of the pallet that cannot be molded using a thicker extruded sheet because the formation of the pallet feet requires a deep draw of material in the "vertical plane" and, as such, will not be uniform over the horizontal plane of the extruded sheet. Other disadvantages associated with the geometric restrictions of an extruded sheet having a uniform thickness are apparent and will be described in more detail below in conjunction with the description of the present invention.

A series of U.S. Pat. Nos. (the Polk patents) 7,208,219; 6,900,547; 6,869,558; and 6,719,551 describe molding systems for producing a thermoplastic resin of thermoplastic composite parts using either a vacuum or compression mold with parts being fed directly to the molds from an extrusion die while the thermoplastic slab still retains the heat used in heating the resins to a fluid state for forming the sheets of material through the extrusion die. These patents describe a thermoplastic molding process and apparatus using a thermoplastic extrusion die having adjustable gates (dynamic dies) for varying the thickness of the extruded material, which material is molded as it is passed from the extrusion die. In addition they describe a continual thermoforming system that is fed slabs of thermoplastic material directly from an extruder forming the slabs of material onto a mold that can be rotated between stations.

The thermoplastic material is extruded through an extrusion die that is adjustable for providing deviations from a constant thickness plastic slab to a variable thickness across the surface of the plastic slab. The variable thickness can be adjusted for any particular molding run or can be continuously varied as desired. This allows for continuous molding or thermoplastic material having different thickness across the extruded slab and through the molded part to control the interim part thickness of the molded part so that the molded part can have thick or thin spots as desired throughout the molded part.

The technology of the aforementioned patents has been extremely useful for the production of large parts and for the production of parts made up of composite materials. In particular, the use of these technologies has allowed a "near net shape" deposition of molten composite material into the lower half of mold sets. Since the filled half of the mold represents a "near net shape" of the final molded part, the final compression molding step with the other half of the matched mold can be accomplished at very low pressures (<2000 psi) and with minimal movement of the molten composite material.

As thermoplastic demands continue to grow there is a growing need to occasionally build even larger parts. The use of systems as described in U.S. Pat. Nos. 7,208,219, 6,900, 547, 6,869,558 and 6,719,551, are extremely useful for producing fairly large parts via low pressure molding of complex geometries but moving beyond those sizes would require the use of extremely large and expensive presses for compression molding. There is a need for a new approach, which can produce these much larger parts without the need to use extremely large presses.

The development described herein can provide all of the flexibility and capability for producing large and complex geometries from long-fiber reinforced plastic materials and the use of either thermoplastic or thermoset polymers without the use of larger presses.

SUMMARY OF THE INVENTION

This need is met by a method of forming a molded article including at least the steps of: providing a mold apparatus including at least; an upper mold portion having an exterior pressable surface and an interior surface; a lower mold portion having an exterior pressable surface and an interior surface; a press having a press surface, a portion of the upper mold portion extending beyond the press surface and having an outside the press upper mold portion exterior surface and an outside the press upper mold portion interior surface, a portion of the lower mold portion extending beyond the press surface and having an outside the press lower mold portion exterior surface and an outside the press lower mold portion interior surface; the press being positioned to reversibly position the interior surface of the upper mold portion and the interior surface of the lower mold portion towards each other; the outside the press upper mold portion interior surface and the outside the press lower mold portion interior surface together defining an outside the press internal mold space, when the upper mold portion and the lower mold portion are pressed together; a plate having a first surface and a lower surface, the lower surface of the plate being opposed to the outside the press upper mold portion exterior surface, the plate being separate from the press; at least one expandable member interposed between the second surface of the plate and the outside the press upper mold portion exterior surface; a plurality of vertical arms attached to opposite sides of the plate and forming a plurality of oppositely paired vertical arms, each vertical arm extending towards the lower mold portion, each vertical arm having a terminal portion having a guide, each pair of oppositely paired vertical arms together forming an aligned pair of guides, each aligned pair of guides being dimensioned to receive reversibly a lateral arm therethrough; introducing a plastic material onto the interior surface of the lower mold portion; pressing the upper mold portion and the lower mold portion together by means of the press, and compressing the plastic material between the interior surface of the upper mold portion and the interior surface of the lower mold portion, the guide of each vertical arm concurrently being positioned beyond the outside the press lower mold portion exterior surface; inserting the lateral arm through each aligned pair of guides; expanding each expandable member resulting in the plate moving away from the outside the press upper mold portion exterior surface and each lateral arm being brought into compressive contact with the outside the press lower mold portion exterior surface, and correspondingly compressing further the plastic material residing within the outside the press internal mold space, thereby forming the molded article.

BRIEF DESCRIPTION OF THE DRAWINGS

Other objects, features, and advantages of the present invention will be apparent from the written description and the drawings in which.

DETAILED DESCRIPTION OF THE INVENTION

Figure 1:
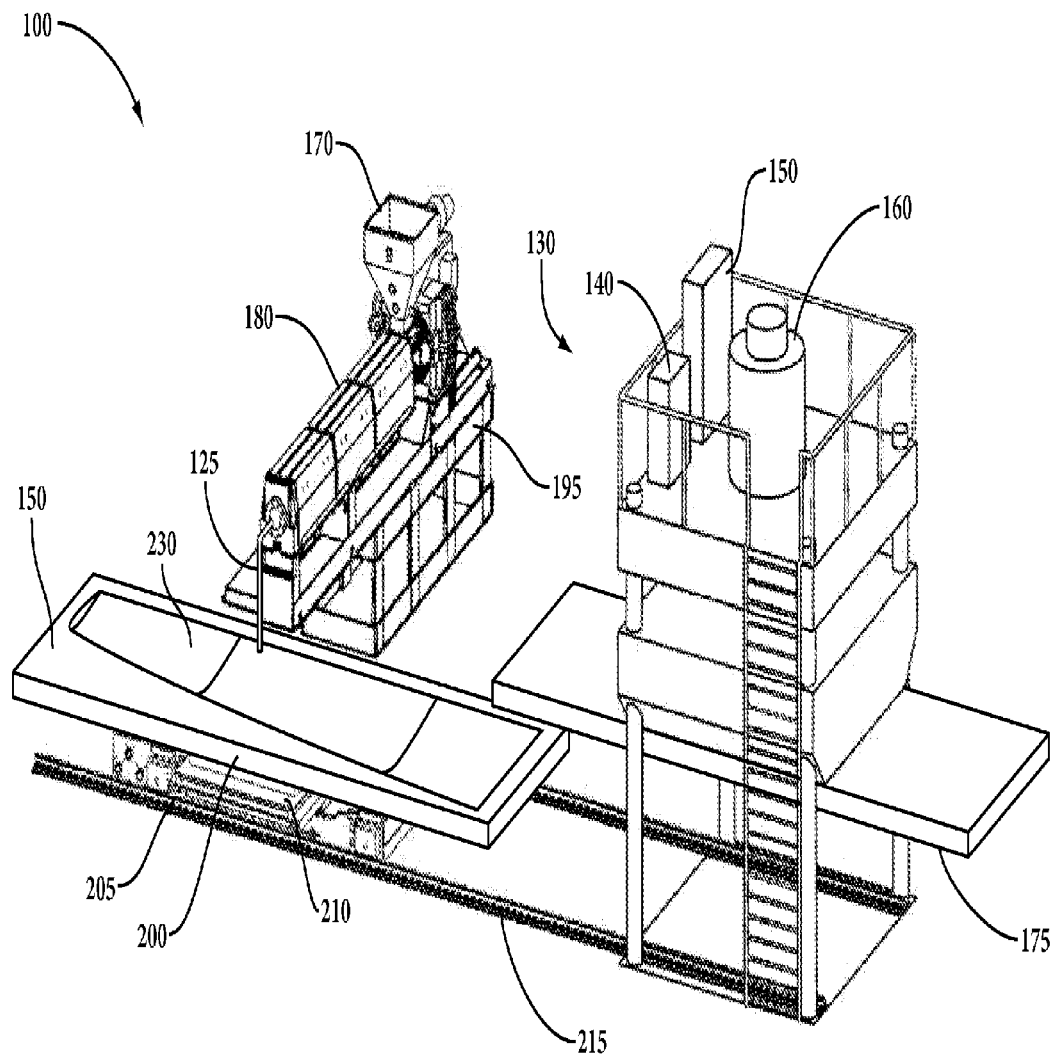
FIG. 1 is an overview of a complete molding system in accordance with the present invention.

In the embodiment shown in FIG. 1 a molding system is shown using a press 130 and a moveable mold support (or trolley) 205 movable along a rail system 215. Alternate embodiments for higher productivity can operate with two presses and two trolleys along the rail system with a press on each end. The trolley 205 supports an extended lower mold 200. An upper mold 175 in shown in press 130. During the deposition phase the lower mold 150, is located directly below a deposition tool 125 that can take different forms in different embodiments, including an injection die, an injection nozzle, or a dynamic die that can deliver variable amounts of molten composite material. The deposition tool 125 is connected to an injection unit barrel 180 supported by an injection barrel frame 195. A material feed hopper 170 accepts polymeric resin or composite material into an auger section where heaters are heating the polymeric material to a molten state while the auger is feeding it along the length of an injection barrel 180 that can be an extruder or an injection head. Heaters (not shown) along injection barrel 180 maintain temperature control. At the exit of injection barrel 180 is shown in one embodiment as a deposition tool 125 for feeding molten composite material precisely into a cavity 230 of lower mold 150. It should be noted that the deposition tool in some embodiments could be as simple as a straight pipe but could also be a (static) sheet die. In other embodiments it can be a dynamic die that supplies variable and controlled amounts of composite material across the die.

Figure 2:
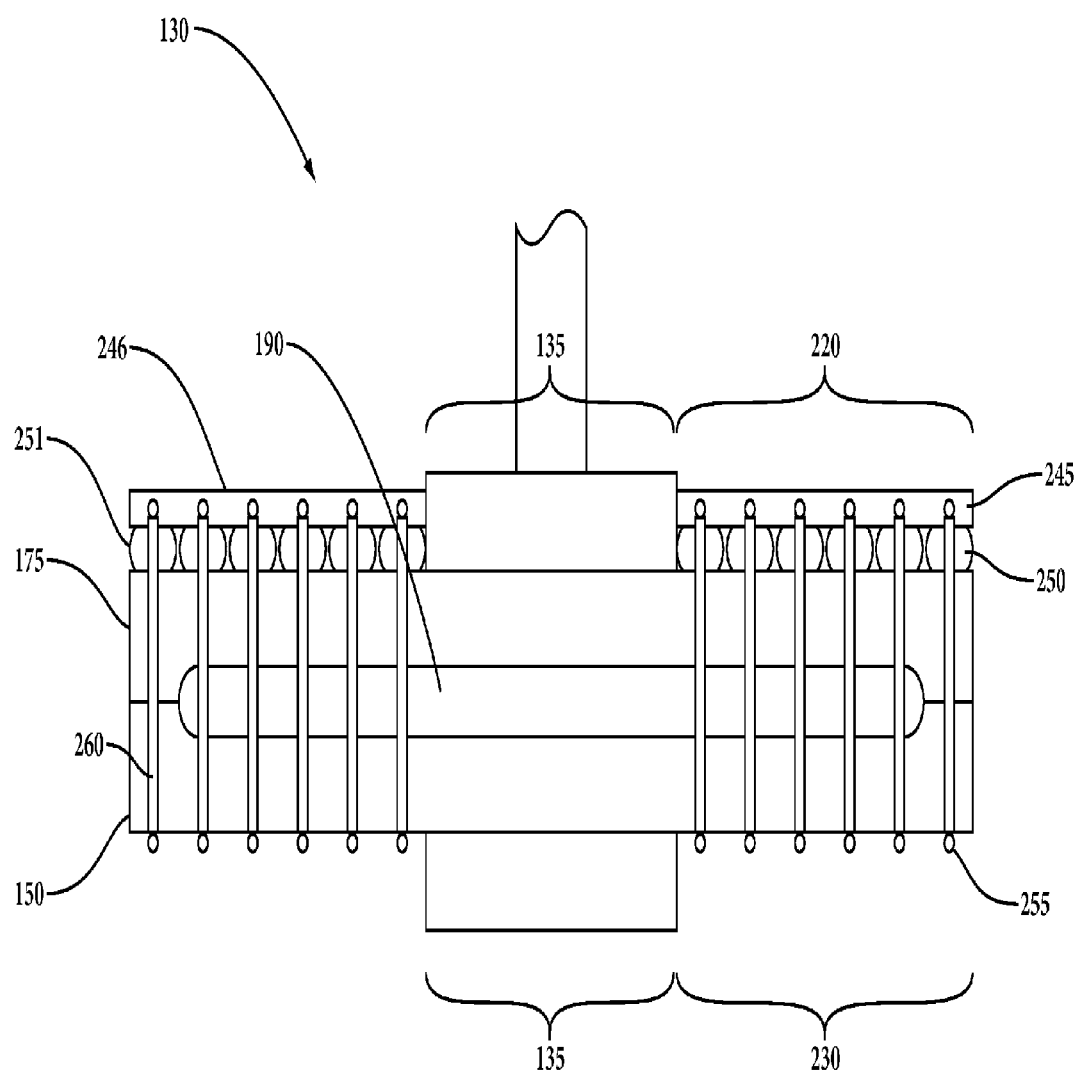
FIG. 2 is a side view of the lower mold assembly of the expanded mold used in FIG. 1.
Figure 3:
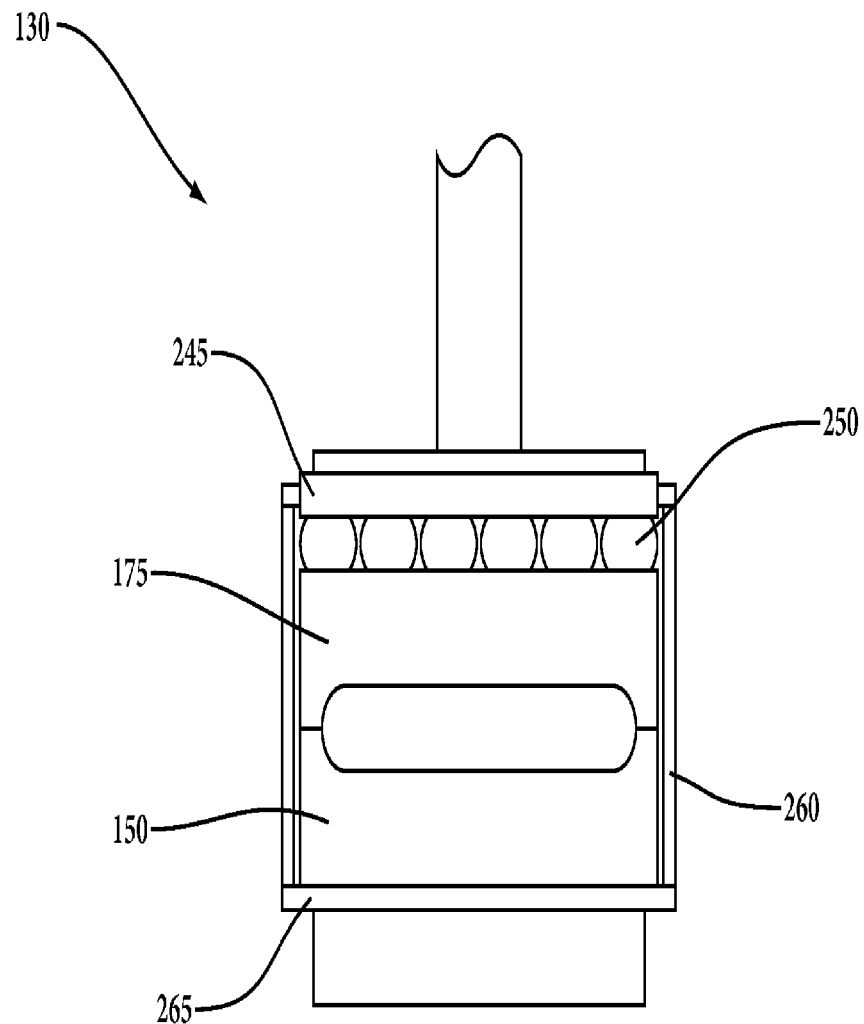
FIG. 3 is an end view of the lower mold assembly of the expanded mold used in FIG. 1.

Looking now at FIG. 2 and FIG. 3 the upper mold 175 corresponding to the lower mold 150 are shown together and now in the press 130. In the press the interior mold surface of the upper mold and the interior mold surface of the lower mold are in facing opposition to each other and form an internal mold space 190. Press 130 has a press area 135 corresponding to the area it exerts its compressive force on the exterior surfaces of upper mold 175 and lower mold 150. The upper mold 175 includes an upper mold outside the press portion 220 that extends beyond the press area. Likewise the lower mold 150 includes a lower mold outside the press portion 230 that extends beyond the press area. Similar outside the press areas exist on the other side of the combined molds.

Extending over a portion of the outside press area of the upper mold is a plate 245. Between the plate 245 and the exterior surface of upper mold outside the press area 220 is an expandable member 250. As will be explained later the expandable member can be expanded to apply pressure to the outside the press portions of the molding. Expandable member 250 can take a number of forms including an expandable pillow or an expandable tubular material that is deployed between the plate 245 and the exterior surface of upper mold outside the press area. A similar plate 246 and expandable member 251 operates on the opposite side of press 130.

The molding method begins with filling the cavities 230 of lower mold 150 in a precise manner by controlled movement of trolley 205 under deposition tool 125 accompanied by varying the volumetric flow of composite material from the injection barrel. Precise filling creates a "near net shape" of the molten composite material in the low mold cavities, leading to lower needed compression molding pressures at molding time. After mold filling the lower extended mold is transported via movement of trolley 205 along rails 215 into press 130. In the press the interior mold surface of the upper mold and the interior mold surface of the lower mold are in facing opposition to each other and form the internal mold space 190. A plurality of vertical arms 260 is attached to opposite sides of plate 245, each vertical arm extending toward and slightly past lower mold 150 as shown and each having a guide 255 such as an eyelet and each pair of oppositely paired vertical arms together forming an aligned pair of guides, with each aligned pair of guides dimensioned to receive a lateral or horizontal arm 265 as shown in FIG. 3. When the press is used to begin pressing the upper and lower mold portions together the guides 255 of each vertical arm 260 are positioned below the lower mold portion exterior surface and a lateral or horizontal arm 265 is inserted through each aligned pair of guides 255.

With the vertical and horizontal arms in place and connected the expandable member 250 is then expanded. The plate 245 is thus moved away from the outside the press upper mold portion, thereby further compressing the composite material residing within the outside the mold internal mold space. The expandable member expansion is controlled so that the compressive force within the press surface and the outside the press pressures are substantially equivalent.

This technique thus allows the compression molding of very large parts that lie outside the press envelope of a press.

Returning to FIG. 1 press 130 contains an upper mold required for compression molding of the parts. It has a hydraulic ram 160 for applying compressive force as well as two control cabinets 140, 150. With respect to the complete lower mold assembly, in a first embodiment there is a first trolley 205 that rides on rails 215. The trolley can move back and forth below deposition tool 125 in a direction (the x direction) that is parallel to rails 215.

To achieve control of material deposition in the "y" direction, that is, perpendicular to the rails, in a second embodiment the system may have a second movable structure (the second trolley) 210 with a table guide that rides on y-direction tracks above the first trolley. The combination of being able to control both x and y direction movement by use of one trolley riding on the other gives control of the x-y plane. When this is combined with the ability to control the volumetric flow of molten composite material emanating from deposition tool 125, this gives in effect 3-axis control and the capability to create "near net shape" parts on the lower mold before the upper mold is applied for compression. In the first embodiment of a single trolley on which the lower mold rides, this allows control in the x-direction only and control in the y (perpendicular to the tracks 215) direction is achieved by use of a dynamic die that can deliver controlled amounts of composite material across the mold in the y-direction. The dynamic die is described in U.S. Pat. Nos. 7,208,219; 6,900,547; 6,869,558; and 6,719,551. For purposes of this description the following description of the molding process will be based on the two-trolley system that can be moved in both the x and y directions.

Turning now to the composite material feed system; FIG. 1 show a possible embodiment of a feed system. A material feed hopper 170 accepts polymeric resin or composite material into an auger section where heaters are heating the polymeric material to a molten state while the auger is feeding it along the length of an injection barrel 180 that can be an extruder or an injection molding head. A screw motor with a cooling fan drives a hydraulic injection unit (not shown), with a cooling fan. Heaters (not shown) along the injection barrel maintain temperature control. At the exit of the injection barrel is shown in one embodiment as an injection nozzle 125 for feeding the molten composite material precisely onto the lower mold 230. It should be noted that the injection nozzle in some embodiments could be as simple as a straight pipe, but could also be a sheet die.

The combination of x-y control of the mold base with two trolleys and control of the volumetric flow rate of the molten material 240 allows precise deposition of the molten composite material into the desired location in the cavities 230 lower mold 150 so that a "near net shape" of the molded part is created, including sufficient molten material deposited in locations with deeper cavities in the lower mold. Upon completion of the "near net shape" molten deposition of the composite material, the filled half of the matched mold is mechanically transferred by means of the first trolley system along rails 215 to compression press 130 for addition of and connection of the vertical 260 and horizontal arms 265 for the outside the press final consolidation of the molded part. Since the filled half of the mold represents a "near net shape" of the final molded part, the final compression molding step with the other half of the matched mold can be accomplished at very low pressures (<2000 psi) and with minimal movement of the molten composite mixture.

The extrusion-molding process includes a computer-controlled extrusion system (not shown) that integrates and automates material blending or compounding of the matrix and reinforcement components to dispense a profiled quantity of molten composite material that gravitates into the lower half of a matched mold, the movement of which is controlled while receiving the material, and a compression molding station for receiving the lower half of the mold for pressing the upper half of the mold against the lower half to form the desired structure or part. The lower half of the matched-mold discretely moves in space and time at varying speeds and in a back and fourth movement and in both the x and y directions to enable the deposit of material precisely and more thickly at slow speed and more thinly at faster speeds. The polymeric apparatus described above is one embodiment for practicing the extrusion-molding process. Unprocessed resin (which may be any form of regrind or pleated thermoplastic or, optionally, a thermoset epoxy) is the matrix component fed into a feeder or hopper of the extruder, along with reinforcement fibers greater than about 12 millimeters in length. The composite material may be blended and/or compounded by the injection barrel 180, and "intelligently" deposited onto the lower mold half 150 by controlling the output of the injection barrel 180 and the movement of the lower mold half 150 in both the x and y directions relative to the position of deposition tool 125. The lower section of the matched-mold receives precise amounts of extruded composite material, and is then moved into the compression molding station.

The software and computer controllers needed to carry out this computer control encompass many known in the art. Techniques of this disclosure may be accomplished using any of a number of programming languages. Suitable languages include, but are not limited to, BASIC, FORTRAN, PASCAL, C, C++, C#, JAVA, HTML, XML, PERL, etc. An application configured to carry out the invention may be a standalone application, network based, or wired or wireless Internet based to allow easy, remote access. The application may be run on a personal computer, a data input system, a PDA, cell phone or any computing mechanism.

The first trolley may further include wheels (not shown) that provide for translation along rail 215. The rail 215 enables the first trolley to roll beneath the deposition tool 125 and into the press 130. The press operates to press an upper mold into the lower mold. Even though the principles of the present invention provide for reduced force for the molding process than conventional thermoplastic molding processes due to the composite material layer being directly deposited from deposition tool 125 to the lower mold, the force applied by the press is still sufficient to damage the wheels if left in contact with the rail. Therefore, the wheels may be selectively engaged and disengaged with an upper surface of the press. In one embodiment, the first trolley is raised by inflatable tubes (not shown) so that when the tubes are inflated, the wheels engage the rails 215 so that the trolley is movable from under deposition tool 125 to the press. When the tubes are deflated, the wheels are disengaged so that the body of the trolley is seated on the upper surface of a base of the press. It should be understood that other actuated structural components might be utilized to engage and disengage the wheels from supporting the trolley.

The computer based controller (not shown) is electrically coupled to the various components that form the molding system or could operate in a wireless manner. The controller is a processor-based unit that operates to orchestrate the forming of the structural parts. In part, the controller operates to control the composite material being deposited on the lower mold by controlling temperature of the composite material, volumetric flow rate of the extruded composite material, and the positioning and rate of movement of the lower mold via the two trolley x-y system to receive the extruded composite material. The controller is further operable to control the heaters that heat the polymeric materials. The controller may control the rate of the auger to maintain a substantially constant flow of composite material through the injection barrel 180 and into deposition tool 125. Alternatively, the controller may alter the rate of the auger to alter the volumetric flow rate of the composite material from the injection barrel. The controller may further control heaters in the extruder. Based on the structural part being formed, a predetermined set of parameters may be established for the deposition tool to apply the extruded composite material to the lower mold. The parameters may also define how the movement of the two trolley system is positionally synchronized with the volumetric flow rate of the composite material in accordance with the cavities on the lower mold that the define the structural part being produced.

Upon completion of the extruded composite material being applied to the lower mold, the controller drives the first trolley 205 into the press 130. The controller then signals a mechanism (not shown) to disengage the wheels from the track 215 as described above so that the press 130 can force the upper mold against the lower mold without damaging the wheels. The plurality of vertical arms 260 are then connected via the lateral arms 265 and the inflatable member is inflated to apply compressive force on the outside the box portion of the mold.

Note that the extrusion-molding system of FIG. 1 is configured to support one press 130 that is operable to receive the trolley assembly that supports the lower mold to form the structural part. It should be understood that two two-trolley systems might be supported by the tracks or rails 215 with a press on each end so as to provide for forming multiple structural components by a single injection barrel and deposition tool. Note also that while wheels and rails may be utilized to provide movement for the trolley mechanisms as described in one embodiment, it should be understood that other movement mechanisms may be utilized to control movement for the two trolley combination. For example, a conveyer, suspension, or track drive system may be utilized to control movement for the trolley. The invention described herein anticipates any of those embodiments.

The controller may also be configured to support multiple structural parts so that the extrusion-molding system may simultaneously form the different structural parts via different presses. Because the controller is capable of storing parameters operable to form multiple structural parts, the controller may simply alter control of the injection unit and trolleys by utilizing the parameters in a general software program, thereby providing for the formation of two different structural parts using a single injection unit. It should be understood that additional presses and trolleys might be utilized to substantially simultaneously produce more structural parts via a single extruder.

By providing for control of the dual trolley system and reinforced composite material being applied to the lower mold in precise "near net shapes", any pattern may be formed on the lower mold, from a thick continuous layer to a thin outline of a circle or ellipse, any two-dimensional shape that can be described by discrete mathematics can be traced with material. Additionally, because control of the volume of composite material deposited on a given area exists, three-dimensional patterns may be created to provide for structural components with deep draft and/or hidden ribs, for example, to be produced. Once the structural part is cooled, ejectors may be used to push the consolidated material off of the mold. The principles of the present invention may be designed so that two or more unique parts may be produced simultaneously, thereby maximizing production efficiency by using a virtually continuous stream of composite material.

Figure 4:
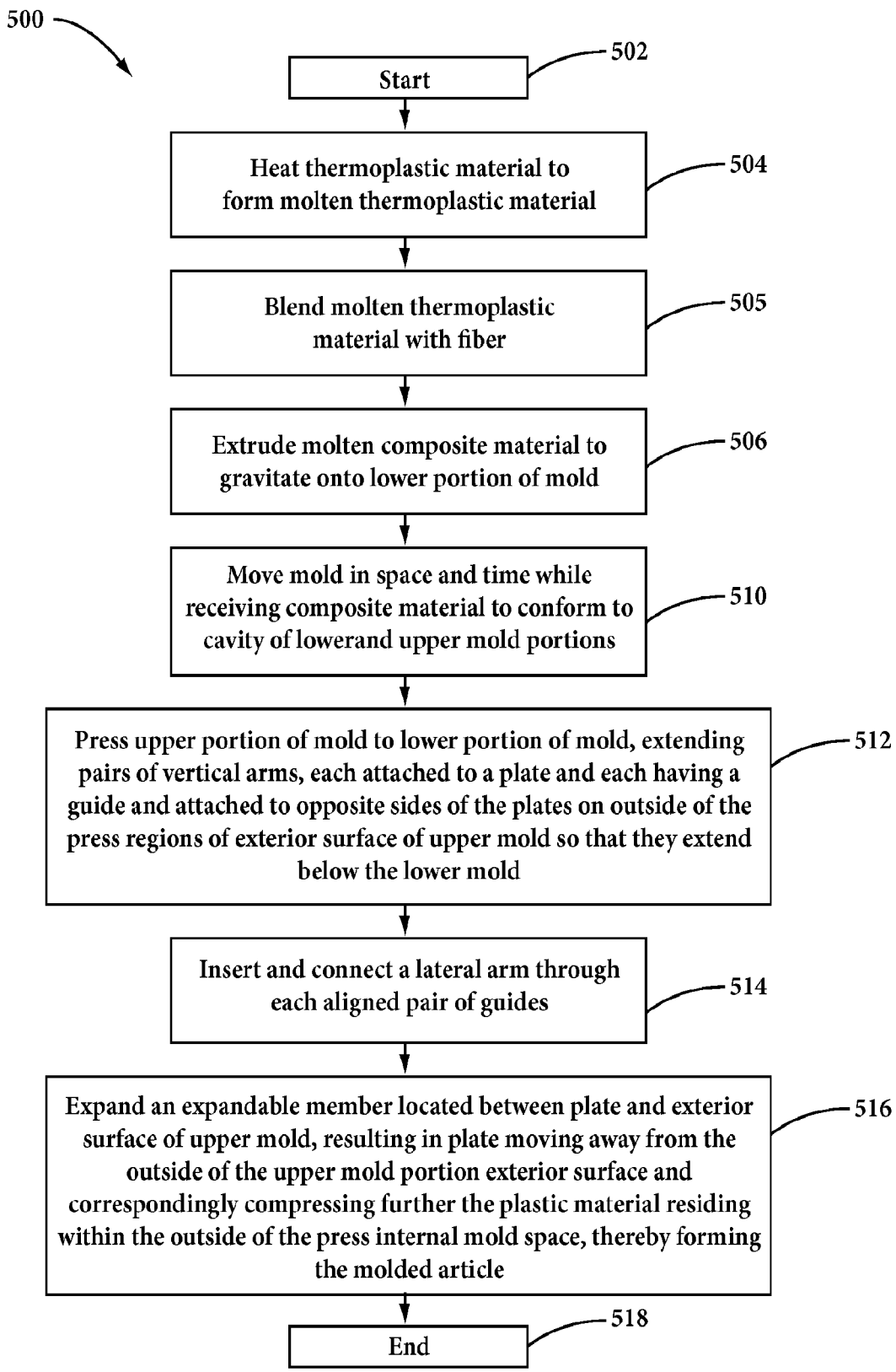
FIG. 4 is a stepwise block diagram description of the process for producing composite polymeric parts using the expanded mold.

FIG. 4 is a flow diagram describing the extrusion-molding process 500 that may be utilized to form articles or structural parts by using either two- or three-axis control for depositing the composite material onto the lower mold 150. The extrusion-molding process starts at step 502. At step 504, the polymeric material is heated to form molten polymeric material and blended with the fiber at step 505 to form a composite material. At step 506, the molten composite material is delivered through injection barrel 180 and then extruded through deposition tool 125 to gravitate onto lower mold 150. In step 510 he lower mold 230 may be moved in space and time in the x-y directions while receiving the composite material to conform the amount of composite material required in the cavity defined by the lower and upper molds. At step 512, the upper mold 175 is pressed to the lower mold 150 to press the composite material into the lower and upper molds and form the article. When this is done the vertical arms 260, attached to plate 245 and each with a guide 255 are extended to a point below lower mold 150 so that in step 514 a lateral arm 265 can be inserted and connected through each aligned pair of guides on each side of the mold. In step 516 the expandable member 250, located between plate 245 and the exterior surface of the upper mold is expanded, resulting in moving the plate 245 away from the outside of the upper mold portion exterior surface and thus compressing further the composite material residing within the outside of the press internal mold space, thereby forming the molded article. The process ends at step 518. In this process the fibers may be long strands of fiber formed of glass or other stiffening material utilized to form large structural parts. For example, fiber lengths of 12 millimeters up to 100 millimeters or more in length may be utilized in forming the structural parts.

Value-Added Benefits of this Extrusion-Molding Process

With this extrusion-molding system, very large long-fiber reinforced plastic parts utilizing higher temperature polymerics may be produced in-line and at very low processing costs, without resort to an excessive sized press. The invention can be used to produce very large compression molded articles, in fact far larger than those limited to press dimensions. When considering the X-Y plane parts can be made as large as 24 meters by 3 meters. The large articles can also be heavy.

The use of the x-y control of the lower mold on the two trolley system result in the reduced hold up times inherent in the deposition tool allow significantly reduced time-temperature history for the molten material when compared to the prior art. Features of the extrusion system provide for a reinforced plastic components production line that offers (i) materials flexibility, (ii) deposition process, (iii) low-pressures, and (iv) machine efficiency. Materials flexibility provides for savings in both material and machine costs from in-line compounding, and further provides for material property flexibility. The deposition process adds value in the material deposition process, which allows for more complicated shapes (e.g., large draft and ribs), better material flow, and ease of inclusion of large inserts in the mold. The low-pressures is directed to reduced molding pressures, which lessen the wear on both the molds and the machines, and locks very little stress into the structural parts. The machine efficiency provides for the ability to use two or more completely different molds at once to improve the efficiency of the extrusion system, thereby reducing the required number of machines to run a production operation. Additionally, the material delivery system according to the principles of the present invention may be integrated with many existing machines and offers configuration flexibility with respect to multiple molds and presses.

Materials Flexibility

The extrusion-molding process allows custom composite blends to be compounded using several different types of resin and fiber. The extrusion system may produce parts with several resins as described above. With traditional compression molding, pre-manufactured thermoplastic sheets, commonly known as blanks that combine a resin with fibers and desired additives are purchased from a thermoplastic sheet producer. These blanks, however, are costly because they have passed through several middle-men and are usually only sold in pre-determined mixtures. By utilizing the extrusion-molding process according to the principles of the present invention, these costs may be reduced by the in-line compounding process utilizing the raw materials to produce the structural parts without having to purchase the pre-manufactured sheets. Labor and machine costs are also dramatically reduced because the extrusion-molding system does not require ovens to pre-heat the material and operators to move the heated sheets to the mold. Since the operator controls the compounding ratios as desired, nearly infinite flexibility is added to the process, including the ability to alter properties while molding or to create a gradual change in color, for example. Also, unlike sheet molding, the extrusion-molding system does not require the material to have a melt-strength, giving the system added flexibility. In one embodiment, the extrusion-molding system may utilize thermoset resins to produce the structural parts. The extrusion-molding system may also use a variety of fiber materials, including carbon, glass and other fibers as described above, for reinforcement with achievable fiber volume fractions of over 50 percent and fiber lengths of 12 millimeters to 100 millimeters or longer with 85 percent or higher of the fiber length being maintained from raw material to finished part.

Deposition Process

The deposition system, according to the principles of the present invention, allows for variable composite material laydown; in regions of the mold where more material is to be utilized for deep draft or hidden ribs, for example, thereby minimizing force utilized during molding and pressing. The variable composite material lay-down results in more accuracy, fuller molds, and fewer "short-shots" as understood in the art than with typical compression molding processes. Variable lay-down also allows for large features to be molded on both sides of the structural part, as well as the placement of inserts or cores into the structural part. Lastly, since the material has a relatively very low viscosity as it is being deposited in a molten state onto the mold (as opposed to being pre-compounded into a sheet and then pressed into a mold), fibers are able to easily enter ribs and cover large dimensional areas without getting trapped or becoming undesirably oriented.

Low-Pressures

The polymeric composite material being deposited during the extrusion-molding process is much more fluid than that from a heated pre-compounded sheet, thus allowing the polymeric composite material to flow much easier into the mold. The fluidity of the composite material being deposited onto the mold results in significantly reduced molding pressure requirements over most other molding processes. Presses for this process generally operate in the range of 100 pounds per square inch, compared with 1,000 pounds per square inch of pressure used for compression molding. This lower pressure translates to less wear, thereby reducing maintenance on both the molds and the press. Because of the lower pressures, instead of needing a steel tool that could cost over $200,000, an aluminum mold, capable of 300,000 cycles, and may be manufactured for as little as $40,000. Less expensive tooling also means more flexibility for future design changes. Since the polymeric resin is relocated and formed on the face of the mold under lower pressures, less stress is locked into the material, thereby leading to better dimensional tolerance and less warpage.

Machine Efficiency

Because the extrusion-molding process may use two or more molds running at the same time, there is a reduction in the average cycle time per part, thus increasing productivity as the first mold set may be cooled and removed while a second mold is filled and compressed. Also, the extrusion-molding system utilizes minimal redundant components. In one embodiment, the extrusion system utilizes a separate press for each mold, but other equipment may be consolidated and shared between the mold sets and may be easily modified in software to accommodate other molds. The extrusion and delivery system 100 further may be integrated into current manufacturing facilities and existing compression molds and presses may be combined.

Advantageously, the present invention permits molding of articles having solid raised three-dimensional features. A non-limiting list of these raised features are blind ribs, posts, mounting posts, and tabs.

The molding process conducted in accordance with the present invention is conducted at substantially lower compression pressures than those typically used in the industry. Advantageously, these low pressures permit the use of non-metallic molds, such as wooden molds, which would generally not be able to withstand the high pressures used in the industry.

Any type of fibrous material can be used in the present invention. For example, the fibrous material can be glass fibers, fiberglass, carbon fibers, synthetic fibers, metal fibers, natural fibers, cellulose, or wood. In addition novel nanoparticle additives can be used.

Any kind of polymeric resin can be used to prepare articles in accordance with the present invention. Examples of suitable polymeric resins, some thermoplastic and some thermoset, are polyolefins, polyhaloolefins, polyaromatics, poly (alkenylaromatics), polystyrene, acrylonitrile/butadiene/ styrene resins, polyamides, nylon, poly(carboxylic acids), polyamines, polyethers, polyether imides, polyacetals, polysulfones, poly(organicsulfides), poly(organicoxides), polyesters, polycarbonates, polyimides, polyurethanes, polyetheretherketone resins, styrene/maleic anhydride resins, allyl resins, epoxies, melamine formaldehyde, phenol-formaldehyde, silicones, and mixtures thereof.

The polymeric resin can be a single polymer, or a mixture of two or more polymers. In particular embodiments, the polymeric resin can comprise a homopolymer, copolymer, random copolymer, alternating copolymer, block copolymer, graft copolymer, liquid crystal polymer, or a mixture of these polymers.

The polymeric resin can be a virgin resin, a recycled resin, or a mixture of a virgin resin and a recycled resin in any proportion. The polymeric resin may optionally comprise a coupling agent which enhances bonding of the fibrous material to the resin.

Articles such as pallets, beams, doors, radomes, construction products such as wall panels and modular components, pipes, pillars, and piling can be successfully prepared according to the claimed invention.

The foregoing description is of a preferred embodiment for implementing the invention, and the scope of the invention should not be limited by this description. The scope of the present invention is instead defined by the following claims.

The invention claimed is:
1. A method of forming a molded article comprising:
   a. providing a mold apparatus comprising;
      i. a upper mold portion having an exterior pressable surface and an interior surface;
      ii. a lower mold portion having an exterior pressable surface and an interior surface;
      iii. a press having a press surface, a portion of said upper mold portion extending beyond said press surface and having an outside the press upper mold portion exterior surface and an outside the press upper mold portion interior surface, a portion of said lower mold portion extending beyond said press surface and having an outside the press lower mold portion exterior surface and an outside the press lower mold portion interior surface;
      iv. said press being positioned to reversibly position said interior surface of said upper mold portion and said interior surface of said lower mold portion towards each other;
      v. said outside the press upper mold portion interior surface and said outside the press lower mold portion interior surface together defining an outside the press internal mold space, when said upper mold portion and said lower mold portion are pressed together;
      vi. a plate having a first surface and a second surface, said second surface of said plate being opposed to said outside the press upper mold portion exterior surface, said plate being separate from said press;

vii. at least one expandable member interposed between said second surface of said plate and said outside the press upper mold portion exterior surface;

viii. a plurality of vertical arms attached to opposite sides of said plate and forming a plurality of oppositely paired vertical arms, each vertical arm extending towards said lower mold portion, each vertical arm having a terminal portion having a guide, each pair of oppositely paired vertical arms together forming an aligned pair of guides, each aligned pair of guides being dimensioned to receive reversibly a lateral arm there-through;

b. introducing a polymeric material onto said interior surface of said lower mold portion;

c. pressing said upper mold portion and said lower mold portion together by means of said press, and compressing said plastic material between said interior surface of said upper mold portion and said interior surface of said lower mold portion, said guide of each vertical arm concurrently being positioned beyond said outside the press lower mold portion exterior surface;

d. inserting said lateral arm through each aligned pair of guides;

e. expanding each expandable member resulting in said plate moving away from said outside the press upper mold portion exterior surface and each lateral arm being brought into compressive contact with said outside the press lower mold portion exterior surface, and correspondingly compressing further said plastic material residing within said outside the press internal mold space, thereby forming said molded article.

2. The method of claim 1 wherein each expandable member is an expandable pillow interposed between said second surface of said plate and said outside the press upper mold portion exterior surface.

3. The method of claim 1 wherein each expandable member is an expandable tube interposed between said second surface of said plate and said outside the press upper mold portion exterior surface.

4. The method of claim 1 wherein, a. a portion of said upper mold portion resides in alignment within said press surface and has an intra-press upper mold portion exterior surface and an intra-press upper mold portion interior surface, a portion of said lower mold portion resides in alignment within said press surface and has an intra-press lower mold portion exterior surface and an intra-press lower mold portion interior surface;

b. said intra-press upper mold portion interior surface and said intra-press lower mold portion interior surface together defining an intra-press internal mold space, when said upper mold portion and said lower mold portion are pressed together;

c. further wherein plastic material residing within said intra-press internal mold space is submitted to a compressive intra-press pressure, when said upper mold portion and said lower mold portion are pressed together;

d. plastic material residing within said outside the press internal mold space is submitted to a compressive outside the press pressure, when said upper mold portion and said lower mold portion are pressed together;

e. said compressive intra-press pressure and said compressive outside the press pressure being substantially equivalent.

5. The method of claim 1, wherein said polymeric material is a thermoplastic plastic.

6. The method of claim 1, wherein said polymeric material is a thermoset plastic.

7. The method according to claim 1, further comprising controlling the flow of polymeric material to vary the quantity of molten polymeric material being delivered to the lower portion of the mold.

8. The method according to claim 1, wherein the molten polymeric material is blended with the fibers being between approximately at least 12 millimeters and approximately 100 millimeters in length to form a molten composite polymeric material.

9. The method according to claim 8, wherein said blending forms a molten composite polymeric material having a concentration of fiber of approximately at least ten percent by weight.

10. The method according to claim 8, further comprising varying the volumetric flow rate of the molten composite polymeric material being gravitated onto the lower mold.

11. The method according to claim 8, wherein a first layer of molten composite polymeric material is extruded into the lower portion of the mold.

12. The method according to claim 11, wherein a second layer of molten composite polymeric material is layered on top of the first layer.

13. A molding system for forming extended articles larger than the press area of a press from polymeric material and reinforcing material, said molding system comprising:

a. an upper mold portion having an exterior pressable surface and an interior surface;

b. a lower mold portion having an exterior pressable surface and an interior surface;

c. a press having a press surface, a portion of said upper mold portion extending beyond said press surface and having an outside the press upper mold portion exterior surface and an outside the press upper mold portion interior surface, a portion of said lower mold portion extending beyond said press surface and having an outside the press lower mold portion exterior surface and an outside the press lower mold portion interior surface;

d. said press being positioned to reversibly position said interior surface of said upper mold portion and said interior surface of said lower mold portion towards each other;

e. said outside the press upper mold portion interior surface and said outside the press lower mold portion interior surface together defining an outside the press internal mold space, when said upper mold portion and said lower mold portion are pressed together;

f. a plate having a first surface and a second surface, said second surface of said plate being opposed to said outside the press upper mold portion exterior surface, said plate being separate from said press;

g. at least one expandable member interposed between said second surface of said plate and said outside the press upper mold portion exterior surface;

h. a plurality of vertical arms attached to opposite sides of said plate and forming a plurality of oppositely paired vertical arms, each vertical arm extending towards said lower mold portion, each vertical arm having a terminal portion having a guide, each pair of oppositely paired vertical arms together forming an aligned pair of guides, each aligned pair of guides being dimensioned to receive reversibly a lateral arm there-through.

14. The system of claim 13, further comprising a deposition tool, said injection unit barrel and said deposition tool operable to control the flow of composite polymeric material in a varied amount of molten composite polymeric material being delivered to the lower portion of the mold.

15. The system of claim 13, wherein said injection unit barrel is an injection head.

16. The system of claim 15, wherein said injection head includes an screw having a thread spacing large enough to blend the molten polymeric material with the fibers being between approximately 12 millimeters and approximately 100 millimeters in length.

17. The system of claim 13, wherein said injection unit barrel is an extruder.

18. The system of claim 13, wherein said deposition tool is an injection nozzle.

19. The system of claim 13, wherein said deposition tool is an injection die.

20. The system of claim 13 wherein said deposition tool is a dynamic die.

21. The system according to claim 13, wherein the blended molten composite polymeric material has a concentration of fiber of at least approximately ten percent by weight.

22. The system according to claim 13, further comprising a controller coupled to said first trolley and operable to move said first trolley to position the lower mold to form a predetermined quantity of molten composite material of varying thickness on the mold.

23. The according to claim 13, wherein said first trolley includes wheels operable to move the first trolley.

24. The system according to claim 13, further comprising a controller coupled to said injection unit barrel and operable to vary the volumetric flow rate of the molten polymeric composite material and gravitate the molten composite polymeric material onto the lower mold.

25. The system of claim 24, wherein said controller moves said first trolley directly below said injection unit barrel for gravitating the extruded composite polymeric material onto the lower mold.

26. The system of claim 13, wherein said polymeric material is a thermoplastic plastic.

27. The system of claim 13, wherein said polymeric material is a thermoset plastic.

28. The system of claim 13, wherein each expandable member is an expandable pillow interposed between said second surface of said plate and said outside the press upper mold portion exterior surface.

29. The system of claim 13, wherein each expandable member is an expandable tube interposed between said second surface of said plate and said outside the press upper mold portion exterior surface.

* * * * *